Figure 1:
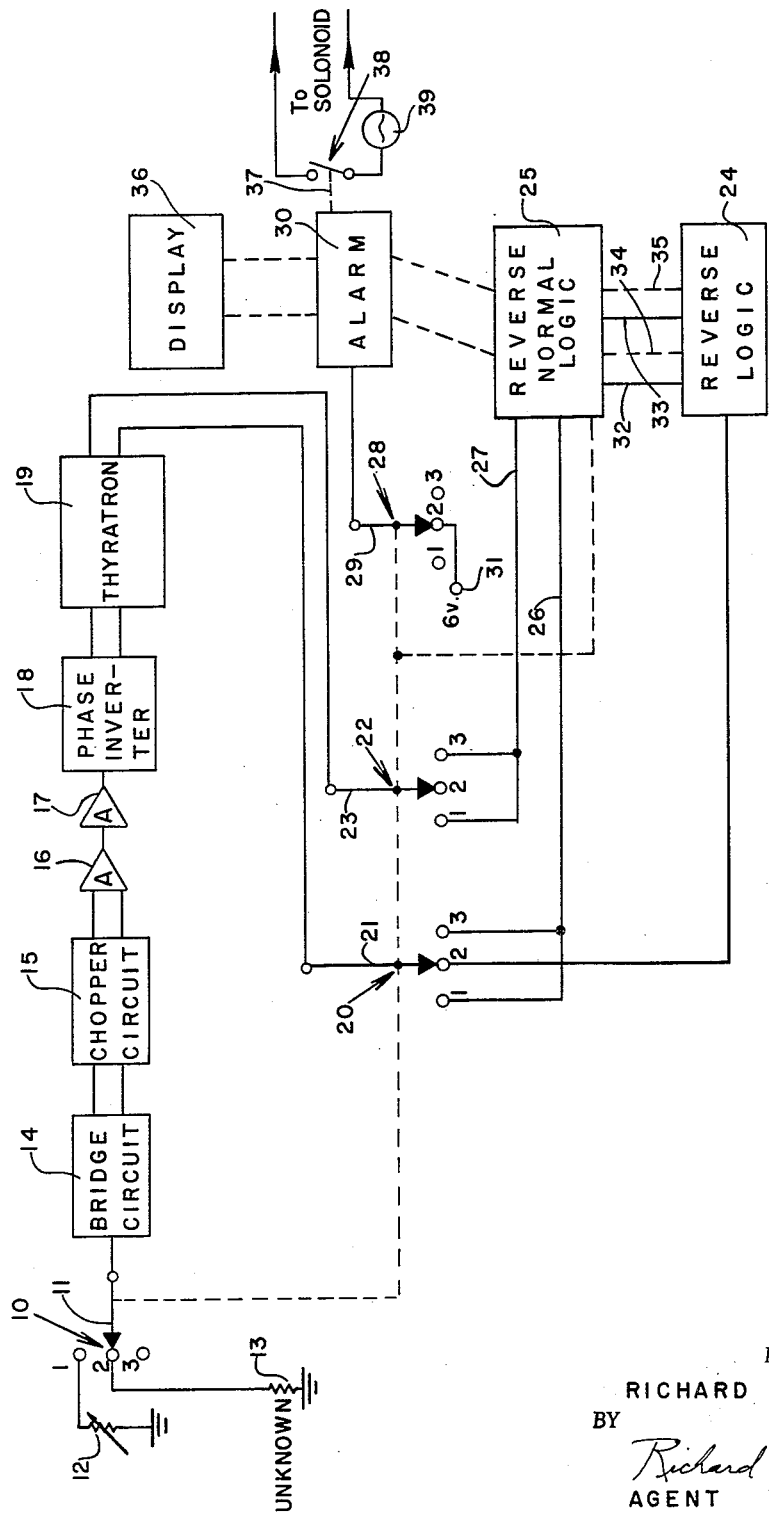

INVENTOR.
RICHARD P. RADKE
BY
*Richard P. Alberi*
AGENT

United States Patent Office 3,157,535
Patented Nov. 17, 1964

3,157,535
MONITORING APPARATUS FOR AUTOMATIC PRODUCTION OF MICROCIRCUITS
Richard P. Radke, Northridge, Calif., assignor, by mesne assignments, to Lear Siegler, Inc., Santa Monica, Calif., a corporation of Delaware
Filed Jan. 15, 1962, Ser. No. 166,323
3 Claims. (Cl. 118—7)

This invention relates to monitor apparatus and more particularly to automatic monitoring apparatus to monitor vacuum deposited films.

Vacuum deposited films are presently being used to produce microcircuits. One of the problems in vapor depositing microcircuits is to monitor the resistance of the film as it is being deposited. There are presently two methods for determining film resistance, and these are:

(1) The method of electrical resistance monitoring; and
(2) The weighing method.

In the method of monitoring film thickness by means of an electrical resistance measurement, an appropriate substrate has silver fired tabs on it and is exposed to the vapor stream through a narrow slot. As the film deposits between the silver tabs, a decreasing resistance is noted between the tabs and is monitored initially with an ohmmeter in order to keep up with the rapid decrease in resistance from infinity. At an appropriate point, the unknown resistance across the monitor is switched over to a Wheatstone bridge in order to get a more accurate reading of the unknown resistance. The difficulties inherent in this method of monitoring are that it is necessary to decrease the rate of evaporation in order to follow the progress on the Wheatstone bridge. However, it is desirable to keep the rate of evaporation constant, an object which cannot be realized by this electrical resistance measurement method of monitoring. Furthermore, the point at which evaporation is ceased, either by turning off the power to the source, or throwing a shutter between the substrate and the source must, by the very nature of the method of operation of the Wheatstone bridge readout, be somewhat arbitrary in that an attempt is made to cease evaporation at a point that has as yet not been reached by the needle of the Wheatstone bridge readout.

The weighing, and second method of monitoring, may be done in one of three ways. The first of these consists of accurately weighing the material to be evaporated and then evaporating the material to completion. This first method of weighing, though it can yield a predetermined thickness with some degree of accuracy, suffers from the disadvantage that it is oftentimes difficult to evaporate to completion. In addition, should the parameters of substrate temperature or pressure vary during the deposition process, it will be found that even though identical weights of material are used within a series of runs, the results do vary over a rather wide range. The second method consists of weighing the refractory metal source with the source of material to be vaporized located together therein, then performing the evaporation, and weighing the source and the remaining source material after evaporation has been completed. The second method has the disadvantage of only yielding results after deposition has been completed with no previous control.

The third method of weighing consists of weighing the substrate prior to the deposition and then after the film has been deposited to determine what weight of vaporized material has been deposited. The third method of weighing also has the obvious disadvantage of only yielding results after the deposition has been completed with no previous control.

It is, therefore, an object of this invention to provide an accurate means of monitoring film thickness of vacuum deposited metal films.

Another object of this invention is to provide an accurate means of continually monitoring the film thickness of a vacuum deposited metal film.

Still another object of this invention is to provide an accurate, reliable, and reproducible means of continually monitoring the film thickness of vacuum deposited metallic films during the process of deposition.

Figure 2:
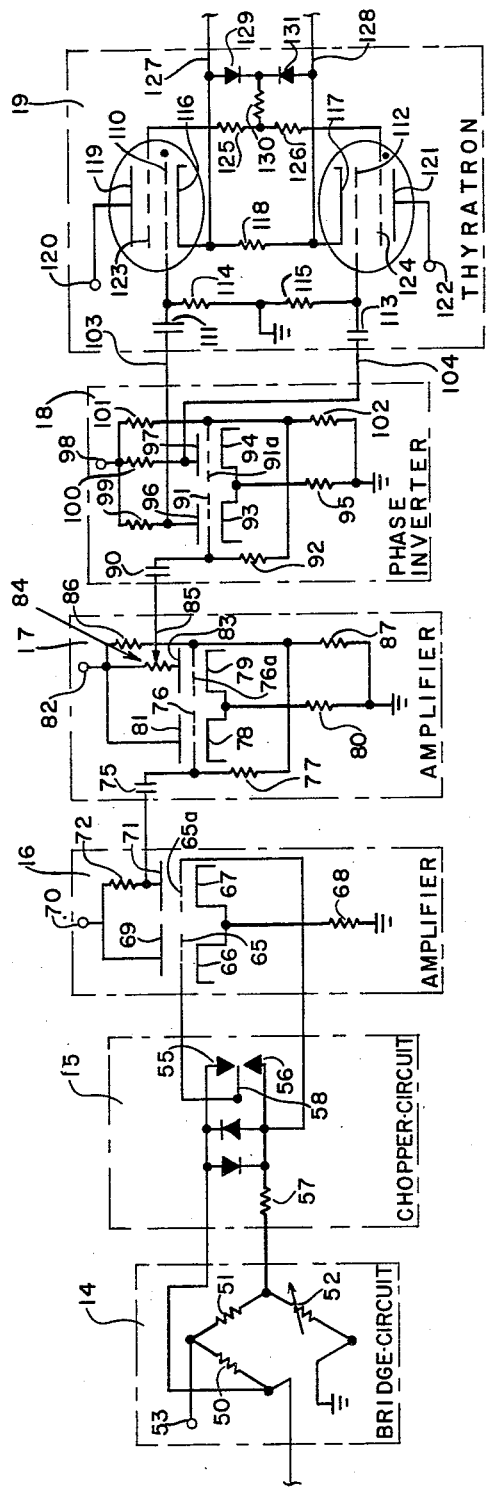
Figure 3:
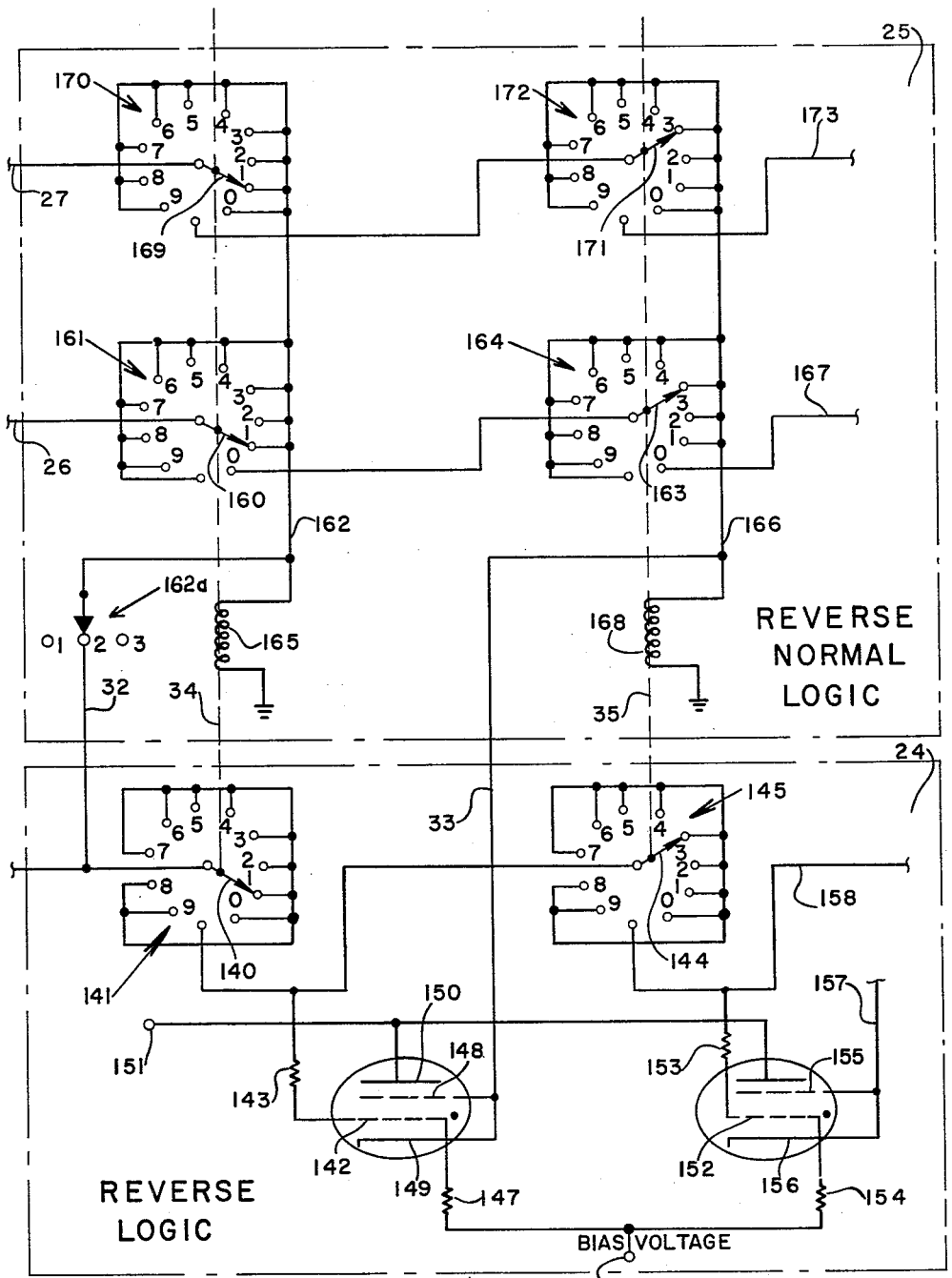
Figure 4:
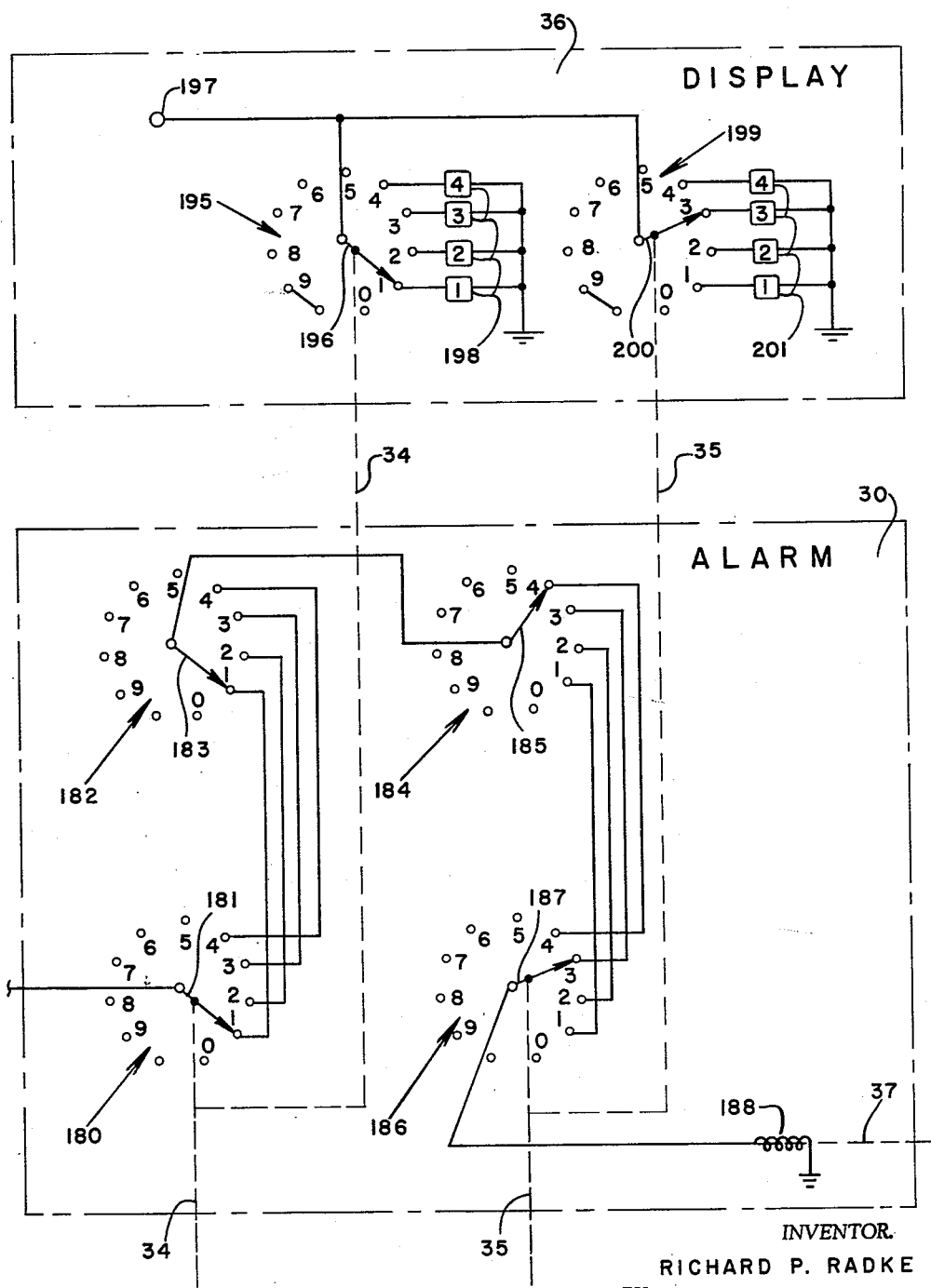

Other objects and advantages will become apparent from the following description when taken in connection with the accompanying drawings, in which:

FIG. 1 is a block diagram of the present invention;
FIG. 2 is a schematic of a typical bridge circuit, chopper, amplifier, phase inverter and thyratron;
FIG. 3 is a typical schematic of the reverse normal logic circuit and reverse logic circuit; and
FIG. 4 is a schematic of the alarm circuit and display circuitry.

Description of FIG. 1

A switch 10 has a wiper arm 11 and terminal positions 1, 2, and 3. Wiper arm 11 is mechanically connected to the wiper arms 21, 23 and 29 in switches 20, 22 and 28 respectively, and to the wiper arm in switch 162a in reverse normal logic 25. Hence when the wiper arm 11 is made to contact terminal position 1 of switch 10, each of the wiper arms in the switches 20, 22, 28 and 162a contacts the terminal position 1. Similarly, when wiper arm 11 is made to contact terminal position 2 of switch 10, the wiper arms in the other switches that are mechanically connected to wiper arm 11, are also positioned to contact terminal position 2. In like manner the wiper arms in all the switches 10, 20, 22, 28 and 162a can be simultaneously shifted or moved to contact position 3 of the respective switches. A variable resistor 12 is electrically connected on one side to ground and on the other side to terminal position 1 of switch 10. The unknown or resistance 13 to be measured is connected on one side to ground and at the other side to terminal position 2. Terminal position 3 of switch 10 is floating. Wiper arm 11 is electrically connected to bridge circuit 14. Chopper circuit 15 is electrically connected to the output of the bridge circuit 14. Error amplifier 16 is electrically connected to the output of chopper circuit 15. Amplifier 17 is electrically connected to the output of amplifier 16. Phase inverter 18 is electrically connected to amplifier 17. Thyratron 19 is electrically connected to the output of phase inverter 18. Switch 20 has the wiper arm 21 electrically connected to one of the outputs of thyratron 19. Switch 20 also has positions 1, 2 and 3. Switch 22 has its wiper arm 23 electrically connected to the other output of thyratron 19. Reverse logic circuit 24 is electrically connected to terminal 2 of switch 20. Reverse normal logic circuit 25 has one input line 26 electrically connected to terminals 1 and 3 of switch 20 and another input line 27 electrically connected to terminals 1 and 3 of switch 22. Switch 28 has wiper arm 29 electrically connected to the alarm circuit 30. Switch 28, again, has terminals 1, 2 and 3. Terminals 1 and 3 of switch 28 are floating and terminal 2 of switch 28 is electrically connected to an electrical potential, for example, six volts by way of terminal 31. Reverse logic circuit 24 is also electrically connected to reverse normal logic 25 by way of electrical leads 32 and 33. Mechanical connections 34 and 35 connect the reverse logic circuit 24, the reverse normal circuit 25, the alarm circuit 30, and also display circuit 36.

The alarm circuit 30 has a mechanical output 37 mechanically connected to switch 38. One side of switch 38 is the electrical output of the present system, the other side of switch 38 completes the circuit for the electrical output of the present system by way of power generator 39.

Description of Bridge Circuit

As seen in FIG. 2, resistors 50, 51 and 52 form three legs of the bridge circuit 14. The input to bridge circuit 14 being electrically connected to switch 10 is either the variable resistor 12 or the unknown resistor 13. This input completes the fourth leg of the bridge circuit. The power to the bridge circuit is supplied by way of terminal 53.

Description of Chopper

One leg of the bridge circuit 14 is electrically connected to stationary contact 55 and the other leg of bridge circuit 14 is electrically connected to stationary contact 56 by way of resistor 57. A vibrating contact 58 is positioned between the stationary contacts 55 and 56 to alternately make and break contact with the stationary contacts 55 and 56.

Description of Error Amplifier 16

The amplifier 16 has the grid 65 electrically connected to the vibrating contact 58 and the other grid 65a electrically connected to the stationary contact 56. Cathodes 66 and 67 are electrically connected to ground by way of resistor 68. Plate 69 is electrically connected to terminal 70, which, in turn, is connected to a reference potential. Plate 71 is electrically connected to terminal 70 by way of resistor 72. The output of amplifier 16 is electrically connected to plate 71.

Description of Amplifier 17

The input to amplifier 17 is electrically connected to output of amplifier 16 by way of capacitor 75. Grid 76 is electrically connected on one side to capacitor 75. Grid 76a is electrically connected to the same side of capacitor 75 by way of resistor 77. Cathodes 78 and 79 are electrically connected to ground by way of resistor 80. Plate 81 is electrically connected to terminal 82, which, in turn, is electrically connected to a reference potential. Plate 83 is electrically connected to terminal 82 by way of potentiometer 84. Potentiometer 84 has a wiper arm 85. Terminal 82 is also connected to ground by way of resistors 86 and 87. Terminal 82 is also connected to one end of grid 76 by way of resistor 86 and 77, and connected to capacitor 75 by way of resistor 86 and resistor 77.

Description of Phase Inverter 18

The input to the phase inverter 18 is electrically connected to the wiper arm 85 by way of capacitor 90. The output side of capacitor 90 is electrically connected directly to the grid 91. Grid 91a is electrically connected to the output side of capacitor 90 by way of resistor 92. Cathodes 93 and 94 are electrically connected to ground by way of resistor 95. Plates 96 and 97 are electrically connected to terminal 98 by way of resistors 99 and 100, respectively. Terminal 98 is electrically connected to a reference potential. Terminal 98 is also connected to grid 91 by way of resistors 92 and 101 and electrically connected to ground by way of resistor 101 and resistor 102. The electrical outputs 103 and 104 are electrically connected to plates 96 and 97, respectively.

Description of Thyratron

Grid 110 is electrically connected to the output line 103 by way of capacitor 111. Grid 112 is electrically connected to the output lead 104 of phase inverter 18 by way of capacitor 113. Grid 110 is also connected to ground by way of resistor 114 and grid 112 is also connected to ground by way of resistor 115. Cathodes 116 and 117 are electrically connected by way of resistor 118. Plate 119 is electrically connected to terminal 120 and plate 121 is electrically connected to terminal 122. Terminals 120 and 122 are electrically connected to an A.C. reference potential. Grids 123 and 124 are electrically connected by way of resistors 125 and 126 respectively. Output lead 127 is electrically connected to plate 116 and output lead 128 is electrically connected to plate 117. Output lead 127 is also connected to resistors 125 and 126 by way of diode 129 and resistor 130. Output lead 128 is electrically connected to resistors 125 and 126 by way of diode 131 and resistor 130.

Description of Reverse Logic

The input to the reverse logic is electrically connected to the wiper arm 140 of switch 141. Switch 141 has eleven positions, ten of which are electrically connected together. The input to reverse logic 24 is also electrically connected by way of lead 32 to the reverse normal logic 25. Switch 141 has its wiper arm 140 mechanically connected to the mechanical connection 34. The electrical connection to ten of the positions of switch 141 is electrically connected to one side of grid 142 by way of resistor 143. The unnumbered position is electrically connected to wiper arm 144 of switch 145. Switch 145 also has eleven positions, ten of which are electrically connected together. The wiper arm 144 of switch 145 is mechanically connected to the mechanical connection 35. The other side of grid 142 is electrically connected to a bias voltage of terminal 146 by way of resistor 147. Grid 148 and cathode 149 are electrically connected to the lead 33. Plate 150 is electrically connected to terminal 151. Terminal 151 is electrically connected to a reference potential. The ten common positions of switch 145 are electrically connected to one side of grid 152 by way of resistor 153. The other side of 152 is connected to the bias voltage at terminal 146 by way of resistor 154. Grid 155 and cathode 156 are electrically connected to the lead 157, which, in turn, is connected to the next stage (not shown) of the reverse logic. The unnumbered position of switch 145 is also connected by way of lead 158 to the next stage (not shown) of the reverse logic.

Description of Reverse Normal Logic

The input lead 26 is electrically connected to the wiper arm 160 of switch 161. Switch 161 has eleven positions, ten of which are electrically connected to a common lead 162 and the eleventh of which, numbered zero, is electrically connected to wiper arm 163 of switch 164. The wiper arm 160 is mechanically connected to the mechanical connection 34 and the lead 162 is electrically connected to one side of relay 165. The other side of relay 165 is connected to ground. Electrical lead 162 is also electrically connected to the lead 32 by way of switch 162a. Switch 162a has positions 1, 2, and 3 and is mechanically connected to switches 10, 20, 22, and 28. Switch 164 has eleven positions, ten of which are electrically connected to a common lead 166. The other position, numbered zero, is electrically connected by way of lead 167 to the next stage (not shown) of the reverse normal logic. The lead 166 is electrically connected to one side of relay 168. The other side of relay 168 is electrically connected to ground. Lead 166 is also electrically connected to lead 33.

The input lead 27 is electrically connected to the wiper arm 169 of switch 170. The switch 170 has eleven positions, ten of which are electrically connected to lead 162 and the eleventh of which is not numbered and is electrically connected to the wiper arm 171 of switch 172. The wiper arm 169 is mechanically connected to the mechanical connection 34. It is to be noted that the relay 165 actuates the mechanical connection 34. Ten of the positions of switch 172 are electrically connected to the lead 166 and the eleventh position, unnumbered, is electrically connected to the lead 173 and on to the next stage (not shown) of the reverse normal logic.

Description of Alarm Circuit

Switch 180 has its wiper arm 181 mechanically connected to the mechanical connection 34. Switch 180 has eleven positions. The wiper arm 181 of switch 180 is electrically connected to a reference potential, for example, six volts. Switch 182 has a manually operated wiper arm 183 and eleven positions. The eleven positions on switch 182 are electrically connected to the corresponding eleven positions of switch 180 (only four such connections are shown on the drawing).

Switch 184 has eleven positions and a wiper arm 185, which is electrically connected to the wiper arm 183 of switch 182.

Switch 186 has eleven positions and a wiper arm 187. The eleven positions of switch 186 are electrically connected to the corresponding eleven positions of switch 184. The wiper arm 187 is mechanically connected to the mechanical connection 35. The wiper arm 187 is electrically connected to ground by way of relay 188. Mechanical connection 37 is the mechanical output of relay 188.

*Description of Display*

Switch 195 has a wiper arm 196 mechanically connected to the mechanical connection 34. The wiper arm is electrically connected to a terminal 197, which, in turn, is electrically connected to a reference potential.

Positions zero through nine of switch 195 are electrically connected to ground by way of display units 198 (only four of which are shown in the drawing). It is to be noted that the display units are numbered corresponding to the terminal at which they are electrically connected, and that the unnumbered position is electrically connected to position number nine.

Switch 199 has eleven positions and a wiper arm 200, which is mechanically connected to the mechanical connection 35. The wiper arm 200 is electrically connected to terminal 197. The positions zero through nine of switch 199 are electrically connected to ground by way of display units 201. It is to be noted again that the display units are numbered corresponding to the number of the terminals to which they are electrically connected, and that the unnumbered position is electrically connected to position number nine.

It is also to be noted that the circuits shown for the bridge circuit, chopper circuit, amplifiers, phase inverter, thyratron, reverse logic, normal logic, alarm, and display are typical circuits and any circuits may be substituted which will perform the functions of the detailed circuits.

*Description of System With Switch 10 in Position No. 1*

With the wiper arm 11 contacting terminal 1 of switch 10, the variable resistor 12 forms the fourth leg of the bridge circuit 14. Unless the variable resistor 12 is set at the exact resistance of resistor 52 in the bridge circuit 14, then there is an output from the bridge circuit 14 which goes to the chopper 15. Voltage from one leg of the bridge circuit 14 is applied to one stationary contact 55 and voltage from the other leg of the bridge circuit 14 is applied to the other stationary contact 56.

The wave formed at the chopper's vibrating contact is a square wave whose peak to peak amplitude represents the difference between the two input voltages. The output of the chopper 15 is fed to the grid of error amplifier 16. If the grid connected to the chopper 15 becomes more positive with respect to the associated cathode 66, then plate current flow in that tube section increases and both cathodes 66 and 67 become more positive. As a result, the second grid is now more negative with respect to its cathode and the plate potential at plate 71 becomes more positive. Thus, the input signal has been amplified but its phase has not been inverted. The capacitor 75 in amplifier 17 removes the direct current component from the square wave and, consequently, feeds the amplifier 17 amplification of an alternating current square wave. The amplifier 17 operates essentially the same as the amplifier 16, and further amplifies the signal without inverting its phase.

The adjustable potentiometer 84 permits adjusting the gain of the amplifier. The phase inverter 18 is capacitively coupled to the amplifier 17 and converts the output of amplifier 17 into two wave forms 180 electrical degrees out of phase with each other. This is done in the following manner: assume that the grid 91 of the phase inverter is driven more positive with respect to ground. Plate 96 is driven more negative and, hence, the output wave form on plate 96 is 180 electrical degrees out of phase with the signal to the grid 91. Since the cathode 93 becomes more positive and since cathodes 93 and 94 share a common resistor 95, the cathode 94 also becomes more positive. Consequently, plate 97 becomes more positive with respect to ground and, therefore, the wave form on plate 97 is in phase with the signal on grid 91.

The thyratron circuit 19 generates pulses in response to signals from the phase inverter 18. The outputs of the phase inverter stage are capacitively coupled by way of capacitors 111 and 113 to the control grids. The grid voltage at which the thyratron can fire is essentially governed by the magnitude of the voltage fed to the thyratron. It is to be noted that the thyratron can fire only if the control grid signal appearing on grid 110 and 112 is in proper phase relationship with the plate voltage of plates 119 and 121. The output signal, therefore, generated on cathodes 116 and 117 is carried on lines 127 and 128, respectively, and determines whether the counter (Display 36) should count up or down. If a signal appears on line 127, it is an indication that the counter should count down. Note, that in the phase inverter description given above, only one phase was considered and the same pulse appeared on lines 103 and 104. However, if the input to the grids 91 and 91a were reversed 180 electrical degrees, the signals on lines 103 and 104 would also be reversed 180 degrees and instead of, for example, a signal appearing on line 127, a signal would appear on line 128.

Since switch 10 is in the number one position, switches 20, 22, 28, and 162a are also in a number one position because they are mechanically connected to the wiper arm 11 of switch 10. The down pulses then are fed to the reverse normal logic 25 on line 26 and the up pulses are fed to the reverse normal logic 25 on line 27. Assuming that an up pulse appears on line 27, the pulse passes through wiper arm 169 of switch 170 down to the relay 165 to actuate the mechanical connection 34, which, in turn, actuates switches 141, 161, 170, 180, and 195. Since switch 162a is in position number one, the pulse that went to the relay 165 can not pass to the switch 141. The relay 165 advances the switches one step down for each pulse it receives. When the wiper arm 169 reaches the unnumbered position of switch 170, the pulse does not go to relay 165, but, rather, to the wiper arm 171 of switch 172. This means that the counter has gone through the digits in one switch and must carry over to the next switch. It is to be noted that normally the switches are in reverse order of that which is shown so that the first switches to see the pulse entering the reverse normal logic are the unit switches, the second switches are the tenths switches, and so on. It is also to be noted that this system moves the switches only in the reverse direction so that in order to change the number on the display from 3 to 4, the switch must go through the complete cycle stopping at number 4.

The display switches 195 and 199 have the wiper arms electrically connected to the terminal 197, which is at some point of reference potential. The wiper arms 196 and 200 are driven also by relays 165 and 168 by way of mechanical connections 34 and 35. The wiper arms 196 and 200 make electrical connections with the display numbers 198 and 201 so that the number displayed corresponds to the position of the wiper arms 196 and 200 of switches 195 and 199.

Switches 182 and 184 of the alarm circuit 30 are manually set so that when the wiper arms 181 and 187 of switches 180 and 186, respectively, reach the positions manually set in the switches 182 and 184, there is an electrical connection between the six volt potential applied to the wiper arm 181 and ground by way of relay 188. Note that when switch 10 is in position two, switch 28 is also in position two and the six volt potential on terminal 31 is applied to wiper arm 181 of switch 180. When this condition exists, relay 188 actuates, thereby closing switch 38, which, in turn, operates the solenoid. However, when switch 10 is in position No. 1, no potential is applied to the wiper arm 181 of switch 180 and, therefore, relay 188 is not actuated. It is to be noted, that as long as there is an unbalance in the bridge circuit 14, the pulses would continue to appear in the reverse normal logic 25 when switch 10 was in position No. 1, and would continue to appear in reverse logic 24 when switch 10 is in position No. 2. However, the resistor 52 in bridge circuit 14 is continually changed by means well known in the art just as the Wheatstone bridge is changed manually; only in this application, the resistance of resistor 52 is changed by the mechanical connections to relay 165 (not shown). Consequently, when the bridge is balanced, the switches actuated by relays 165 and 168 are in a given position; such position is the indication of the resistance of variable resistor 12. Variable resistor 12 is used to set into the system the figure at which the system is to start reverse counting of the unknown resistance 13.

*Description of System With Switch 10 in Position No. 2*

After the operating procedure with switch 10 in the No. 1 position has been completed as described above, the switch 10 is manually turned to position No. 2. It is to be noted, now, that the unknown resistance 13 is the resistance of the area on which a metal film is to be evaporated. Prior to evaporation, obviously, if the substrate is a non-conductive substrate, the resistance is infinite. Therefore, the bridge circuit 14 detects an infinite resistance and the system functions to put out an up pulse from the thyratron 19, but since switch 10 is in position No. 2, switch 22 is also in position No. 2, and the up pulse is connected to the floating terminal 2 of switch 22. Consequently, the up pulse proceeds no further and whatever value was put on to the system by way of variable resistor 12, is now locked into the system until such time as a down pulse appears from the thyratron to the switch 20. Such down pulse appears when the unknown resistance 13 goes below the value of the resistance set into the system by way of variable resistor 12. When such down pulse appears, switch 20 is in position No. 2, and it is to be noted that the down pulse goes directly to the reverse logic 24 and not to the reverse normal logic 25, but since switch 162a is also in the Number 2 position, the pulse also passes to the relay 165 to excite relay 165, which in turn, moves the switches 141, 161, 170, 180, and 195 to the next lower position. When the wiper arm 140 of switch 141 has reached the unnumbered position, the pulse entering the reverse logic not only goes to the reverse logic 24, it also goes to the thyratron grid 142 and to the wiper arm 144. This is the shift position, where a new pulse has to drive relay 165 in order to put wiper arm on position 9, and also has to drive relay 168 in order to put wiper arm 144 on switch 145, in the next lower position.

When the down pulses have driven the switches to the position manually set in the alarm 30 and the relay 188 is excited and switch 38 is closed thereby actuating the solenoid, a device such as a shutter is actuated by the solenoid to prohibit any further depositions of material on the unknown resistance area. It should be noted that the reason for setting in an unknown resistance in position No. 1 is so that the system will not have to track the resistance from infinity to the resistance set in the alarm 30. This would unduly tax the system because of the rapid changes from infinity.

It should also be noted that the resistance set in the variable resistor 12 should be higher than the desired resistance to be deposited since the system will only count down from the resistance value set in by way of variable resistor 12.

*Description of System With Switch 10 in Position No. 3*

Position No. 3 of switch 10 is substantially identical to position No. 1 with the exception that variable resistor 12 is not connected to position No. 3 and is used merely so that the system can function as a standard ohmmeter to measure resistance.

*Example*

This system has been used wherein a target resistance of 5000 ohms was set in the alarm circuit and a resistance of 5006 ohms was set in the system by way of resistor 12. A shutter was provided which was operated by the solenoid, which, in turn, was actuated by way of switch 38. The shutter was positioned by the solenoid between the monitored resistance and the source of material to be evaporated when the monitored resistance reached the exact value set into the alarm circuit 30. A satisfactory thin metallic film of beryllium-copper was deposited to a thickness sufficient to provide the desired resistance. The thin film resistor so formed, exhibited satisfactory performance in an electrical circuit.

Although this invention has been particularly described above, it is not intended that it should be limited by the above description, but only in accordance with the spirit and scope of the appended claims.

What I claim:

1. Means for monitoring vapor depositions wherein a source of material is to be evaporated and deposited as a thin film upon a substrate and wherein means are provided which are capable of ceasing the deposition of the material at a predetermined electrical resistance value of said thin film, comprising:

electrical means for measuring the electrical resistance of the thin film deposited material;

storage means operatively associated with said electrical means;

means for setting into said storage means a predetermined electrical resistance value;

said storage means being connected to said means for ceasing the deposition of said material such that when said electrical means measures the electrical resistance value equal to the value set into said storage means, said storage means operates said means to cease said material from being further deposited and a display unit to display the electrical resistance values measured by said electrical means, said display unit being electrically connected to said electrical means such that said display unit only displays diminishing electrical values.

2. Means for monitoring vapor depositions wherein a source of material is to be evaporated and deposited as a thin film upon a substrate and wherein means are provided which are capable of ceasing the deposition of the material at a predetermined electrical resistance value of said thin film, comprising:

electrical means for measuring the electrical resistance of the thin film deposited material;

storage means operatively associated with said electrical means;

means for setting into said storage means a predetermined electrical resistance value;

said storage means being connected to said means for ceasing the deposition of said material such that when said electrical means measures the electrical resistance value equal to the value set into said storage means, said storage means operates said means to cease said material from being further deposited;

a display means to display the electrical resistance values measured by said electrical means, said display means being electrically connected to said electrical means such that said display means only displays diminishing electrical values; and means for setting an electrical resistance value into said display means thereby preventing said display means from displaying any electrical resistance value above said preset electrical resistance value.

3. Means for monitoring vapor depositions wherein a source of material is to be evaporated and deposited as a thin film upon a substrate and wherein means are provided which are capable of discontinuing the deposition of said material at a predetermined electrical resistance value of said thin film, comprising:

a first variable resistance means;

an electrical logic means having first switch means and relay means;

electrical means including a Wheatstone bridge means, for measuring the electrical resistance of the thin film deposited material and feeding an output signal to said logic means;

said Wheatstone bridge means having a second variable resistance operatively connected to be actuated by said logic means, wherein said second variable resistance in said bridge means is balanced against said first variable resistance means at a resistance value of said first variable resistance greater than said required predetermined resistance of said thin film, thereby presetting said first switch means in said logic means at a setting corresponding to the value of the resistance of said first variable resistance means;

alarm means having a second and a third electrically connected switch means, said second switch means being employed for presetting the electrical resistance value of the material deposited at which deposition is to be discontinued;

fourth switch means for disconnecting said first variable resistance means and connecting said deposited thin film for balancing in said Wheatstone bridge means;

whereby no signal is passed to said alarm means until the resistance of said deposited film has decreased to the value preset on said first switch means in said logic means, and thereafter further predetermined incremental decreases in the resistance value of said thin film causes said relay means to operate said second variable resistance in said Wheatstone bridge to balance same for each successive such incremental decrease, and also to operate said third switch means in said alarm means;

display means operatively connected to said third switch means in said alarm means to display changes in electrical resistance of said thin film as said latter electrical resistance descreases by said predetermined increments; and shutter means operatively connected to said alarm means to cause the discontinuance of deposition of said thin film when the electrical resistance of the later has decreased to the value preset on said second switch means.

References Cited by the Examiner
UNITED STATES PATENTS 2,906,235    9/59    Hirsh _____ 118—9 X
2,978,364    4/61    Blaustein _____ 118—7 X RICHARD D. NEVIUS, *Primary Examiner.*